United States Patent [19]
Shafer

[11] Patent Number: 6,044,904
[45] Date of Patent: Apr. 4, 2000

[54] WELLHEAD ASSEMBLY

[75] Inventor: Terry C. Shafer, Woodlands, Tex.

[73] Assignee: CSR Polypipe, Inc., Houston, Tex.

[21] Appl. No.: 08/993,933

[22] Filed: Dec. 18, 1997

[51] Int. Cl.[7] .............................. E21B 33/02; F16L 47/06
[52] U.S. Cl. .................... 166/75.13; 166/95.1; 166/92.1; 166/93.1; 166/94.1; 285/298
[58] Field of Search ................................ 166/75.13, 95.1, 166/92.1, 93.1, 94.1; 285/298

[56] References Cited

U.S. PATENT DOCUMENTS

| | | | |
|---|---|---|---|
| 2,562,946 | 8/1951 | Read | 166/75.13 |
| 4,640,533 | 2/1987 | Klemm | 285/298 |
| 4,720,124 | 1/1988 | Taylor et al. | 285/298 |
| 4,848,458 | 7/1989 | Holdsworth et al. | 166/92.1 |

OTHER PUBLICATIONS

Product Drawing for Ecogas EZ–Flow Wellhead, Feb. 1996.

*Primary Examiner*—David Bagnell
*Assistant Examiner*—Chi H. Kang
*Attorney, Agent, or Firm*—Baker Botts L.L.P.

[57] ABSTRACT

A wellhead assembly provides a connection between a protruding wellhead pipe of a landfill and piping that leads to treatment, disposal, or recovery equipment, or the like. The wellhead assembly includes a first substantially hollow cylindrical member that has a first open end, a second closed end, and a receiving cavity therein. The closed end has an aperture through it that is smaller in diameter than the diameter of the protruding wellhead pipe, and the first substantially hollow cylindrical member is capable of slidably receiving the protruding wellhead pipe within the receiving cavity. The wellhead assembly also includes a second substantially hollow cylindrical member having a first open end and a second closed end. The first open end is coupled to the second closed end of the first substantially hollow cylindrical member, and is positioned so as to surround and enclose the aperture in the first substantially hollow cylindrical member. The second substantially hollow cylindrical member also has an aperture through it. When the protruding wellhead pipe is slidably received within the receiving cavity of the first substantially hollow cylindrical member, a fluid passageway is formed for landfill gases in the protruding wellhead pipe to escape through the receiving cavity and the aperture of the first substantially hollow cylindrical member, into the second substantially hollow cylindrical member, out through the aperture in the second substantially hollow cylindrical member, and into the piping that leads to the treatment, disposal, or recovery equipment.

9 Claims, 1 Drawing Sheet

WELLHEAD ASSEMBLY

TECHNICAL FIELD OF THE INVENTION

The present invention relates in general to landfill wellheads and more specifically to a wellhead assembly that forms a connection between a landfill waste gas wellhead and treatment, disposal, or recovery equipment.

BACKGROUND OF THE INVENTION

Waste material that accumulates in landfills is collected in an area until it reaches a certain depth, and is then covered by a thin layer of soil. This process is repeated until the depth of the waste material or soil layers reach several hundred feet, and then the landfill is covered by a final layer of soil. Much of the waste material is composed of biodegradable materials, and the decomposition of these materials in the landfill environment produces methane and other flammable gases, often deep underground. If these gases are not collected and treated, they may leak to the surface, causing air pollution and becoming a flammability hazard for vehicles. Further, similar gases may diffuse horizontally through the soil, resulting in these hazards far from the landfill itself.

To combat these hazards, wells are often constructed to collect and transport the methane and other gases to a facility where they can be disposed of safely. Typically, a hole is drilled into the landfill to where the gases are generated. Pipe sections, normally made of polyethylene, which is resistant to the corrosive environment of the landfill, but occasionally made of other materials such as carbon steel or PVC, are lowered into the hole to provide a conduit for the escaping gases. These sections are joined to create a continuous conduit to the surface of the landfill. The piping is perforated at the lower end to allow the gases to reach the interior of the piping, and the upper portion of the piping is solid in order to provide a continuous conduit. The top of the piping extends a few feet beyond the surface of the landfill, and is connected to a vacuum system used to pull the gases upward from their point of generation through the use of flexible or fixed piping. This extension of the well beyond the surface of the landfill is termed a wellhead pipe. In some known wellhead assemblies, the connection from the vacuum system to the wellhead pipe is made using a flanged connection. In other known wellhead assemblies, the connection is made by a pipe member or the like that fits over the wellhead pipe and is permanently secured by glue or another bonding material to the wellhead pipe to prevent any gas from escaping. There may be as many as two hundred or more of these wells and connections in a large landfill. Each of the known wellhead assemblies involves securing the wellhead assembly to the wellhead pipe in a manner that renders it extremely difficult or impossible to subsequently remove. As will be described in further detail below, this inherent feature of known wellhead assemblies is quite problematic, because wellhead assemblies must frequently be removed from their corresponding wellhead pipes.

Because of the decomposition of the biodegradable materials and the natural settling processes in the landfill, the surface of the landfill may be reduced in elevation by many feet over time. As a result of this settling, the polyethylene piping that previously extended merely a few feet above the surface may eventually extend many feet beyond that. The flexible connection is then difficult to service and inflexible piping may be strained. The operator of the landfill must then cut the wellhead pipe, and reattach a wellhead assembly to the newly cut wellhead pipe. For wellhead assemblies that are connected via a flange, it is a difficult and laborious process to first remove the wellhead assembly from the old flange, and then weld a new flange onto the newly cut wellhead pipe and reconnect the wellhead assembly. Further, for wellhead assemblies that are permanently affixed to a wellhead pipe, such as by gluing or the like, it is extremely difficult to reuse the wellhead assembly. At the very least, the wellhead piping must be cut to the newly desired height, the new wellhead assembly installed, and then the wellhead assembly glued to the wellhead piping. This process may take several hours, and must be done by specially trained personnel who are exposed to the hazards of the escaping gases for that time.

This difficulty presents serious problems since, once installed, wellhead assemblies must routinely be removed in order to service the landfill wells. For example, it is often necessary to periodically check the pressure differential in the well. This is typically accomplished by removing the wellhead assembly, inserting an orifice plate within the upper end of the wellhead pipe, replacing the wellhead assembly, and measuring the pressure at a point below the orifice plate and at a point above the orifice plate. As indicated, for known wellhead assemblies that are welded, bolted or glued to the wellhead pipe, this is a difficult and time consuming procedure. For such known wellhead assemblies, any other type of maintenance or servicing that requires removal of the wellhead assembly, such as pumping out a flooded well, will likewise be difficult and time consuming.

SUMMARY OF THE INVENTION

Accordingly, there is a need for a wellhead connection, hereinafter a wellhead assembly, that can be removed quickly and can be reattached without substantial maintenance personnel effort. In accordance with the present invention, a wellhead assembly is provided for slidably receiving a protruding wellhead pipe that has a given diameter and is readily removable from the protruding wellhead pipe. The wellhead assembly includes a first substantially hollow cylindrical member having a first open end, a second closed end, an outer wall, an inner wall, and a receiving cavity therein. The closed end has a first aperture through it that has a diameter that is smaller than that of the protruding wellhead pipe. The receiving cavity of the first substantially hollow cylindrical member is capable of slidably receiving within it the end of the protruding wellhead pipe. The wellhead assembly also includes a second substantially hollow cylindrical member that includes a first open end and a second closed end, with the first open end being coupled to the closed end of the first substantially hollow cylindrical member and positioned to surround and enclose the first aperture. The second substantially hollow cylindrical member further has a second aperture to allow connection to disposal or vapor recovery equipment. Once the wellhead assembly slidably receives the protruding wellhead pipe, there is formed a fluid passageway from the protruding wellhead pipe, through the first substantially hollow cylindrical member, through the first aperture, into and through the second substantially hollow cylindrical member and exiting the second substantially hollow cylindrical member through the second aperture. At least one substantially annular gasket ring extends circumferentially around and communicates with the inner wall of the first substantially hollow cylindrical member. The substantially annular gasket ring also extends circumferentially around and communicates with the protruding wellhead pipe so as to form a fluid seal between the protruding wellhead pipe and the first substantially hollow cylindrical member when the first substantially hollow cylindrical member has received the protruding wellhead pipe within the receiving cavity. When settling of the landfill occurs, the wellhead assembly may be slidably removed, the protruding wellhead pipe may be cut, and the wellhead assembly may slidably receive the new end of the protruding wellhead pipe.

DESCRIPTION OF THE DRAWINGS

For a more complete understanding of the present invention and the advantages thereof, reference is now made to the following description taken in conjunction with the accompanying drawings in which like reference numbers indicate like features, wherein.

DETAILED DESCRIPTION OF THE INVENTION

Figure 1:
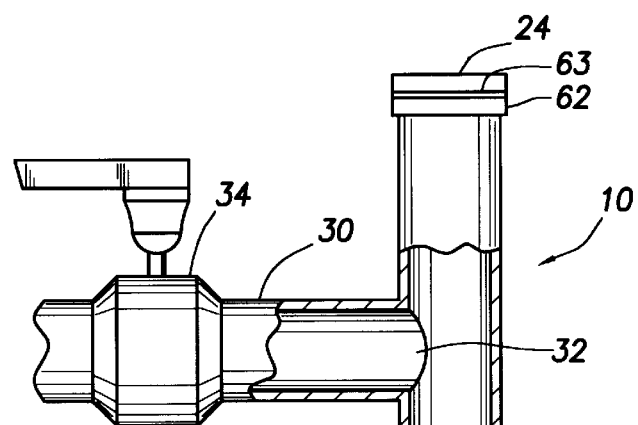
FIG. 1 is a side view of one embodiment of a wellhead assembly according to the present invention attached to a protruding wellhead pipe, including a cutaway section.

Shown in FIG. 1 is an embodiment of the wellhead assembly 10 of the present invention that is attached to a protruding wellhead pipe 20. The wellhead assembly 10 is comprised of a first substantially hollow cylindrical member 12 and a second substantially hollow cylindrical member 14. The first substantially hollow cylindrical member 12 has a closed upper end 16 and a lower open end 18. The lower open end 18 of the first substantially hollow cylindrical member 12 is capable of slidably receiving the protruding wellhead pipe 20. The second substantially hollow cylindrical member 14 has an open lower end 22 and a closed upper end 24. The lower open end 22 is coupled to the upper closed end 16 of the first substantially hollow cylindrical member 12.

The embodiment of the invention shown in FIG. 1 also includes securing nuts 60 that may be used to secure the wellhead assembly to the protruding wellhead pipe. In one embodiment, a pipe clamp 26 that extends circumferentially around the first substantially hollow cylindrical member 12 may also be included. This pipe clamp 26 may be adjusted using the tightening mechanism 28 to counteract the tendency of the first hollow cylindrical member 12 to expand in response to elevated gas temperatures in the protruding wellhead pipe 20. In this manner the seal between the protruding wellhead pipe and the first hollow cylindrical member is maintained.

The second substantially hollow cylindrical member 14 includes an aperture 32 therein. A section of pipe 30 is coupled to the second substantially hollow cylindrical member 14, and is positioned so as to surround and enclose the aperture 32. A valve 34 is coupled to section of pipe 30, which in turn is connected to a vacuum system or the like for extracting the hazardous gases from the landfill so that they may be further processed. The valve 34 may be opened or closed as necessary to control the flow of gases through the protruding wellhead pipe 20 and through the wellhead assembly 10 so that they may be recovered, collected, or destroyed at a connected facility.

In one embodiment of the present invention, the closed end 24 of the second hollow cylindrical member 14 further includes a removable cap 62. This removable cap is tightly secured to the second hollow cylindrical member by a cap tightening member 63, such as a pipe clamp, but may be easily removed when necessary to allow the well to be more easily serviced.

Figure 2:
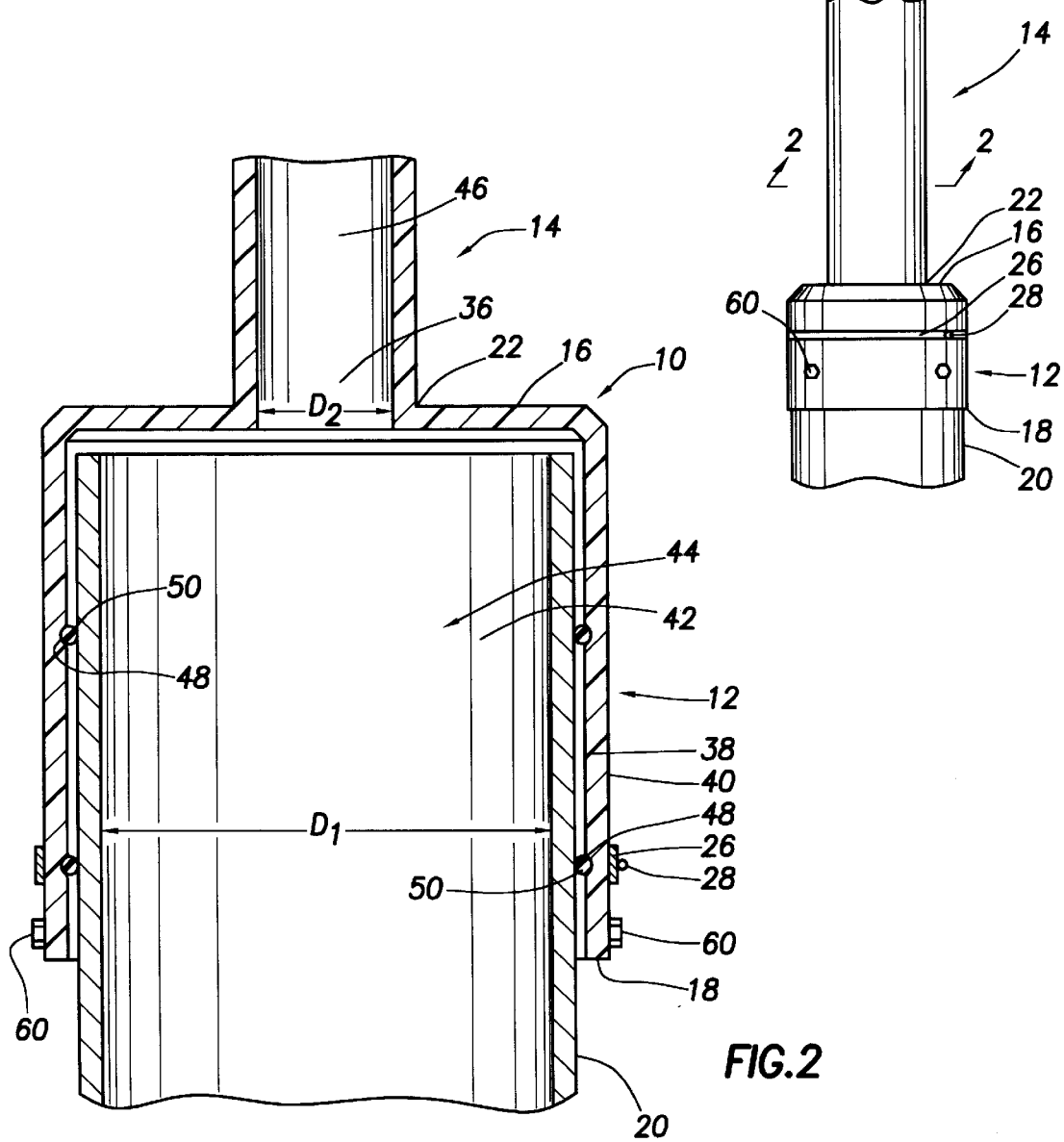
FIG. 2 is a cross-sectional, cut-away view of the wellhead assembly, taken through line AA of FIG. 1, engaged with a protruding wellhead pipe.

Shown in FIG. 2 is a cross-sectional, cut-away view of an embodiment of the wellhead assembly 10 of the present invention (taken along line AA of FIG. 1) engaged with a protruding wellhead pipe 20 having a diameter $D_1$. As indicated above, the first substantially hollow cylindrical member 12 is comprised of an upper closed end 16 and a lower open end 18. The upper closed end 16 has an aperture 36 therethrough, and the aperture 36 has a diameter $D_2$. The diameter $D_2$ of the aperture 36 is sized so as to be smaller than the diameter $D_1$ of the protruding wellhead pipe 20. The first substantially hollow cylindrical member 12 further has an inner wall 38 and an outer wall 40, with the upper closed end 16 and the inner wall 38 defining a receiving cavity 42 which is capable of slidably receiving the protruding wellhead pipe 20.

The open lower end 22 of the second substantially hollow cylindrical member 14 is coupled to the upper closed end 16 of the first substantially hollow cylindrical member 12, and is positioned so as to surround and enclose the aperture 36 of the first substantially hollow cylindrical member 12. The second substantially hollow cylindrical member 14 has an interior cavity 46. When the wellhead assembly 10 has slidably received the wellhead pipe 20 within its receiving cavity 42, a fluid passage 44 is formed to transport the landfill gases from the protruding wellhead pipe 20 to the piping 30 (shown in FIG. 1) that transports these gases to an appropriate facility for further processing. These gases travel from the wellhead pipe 20, through the receiving cavity 42, and through the aperture 36 (shown in FIG. 2) of the first substantially hollow cylindrical member 12, and then through the interior cavity 46 and the aperture 32 of the second substantially hollow cylindrical member 14.

Also shown in FIG. 2 are the securing nuts 60 that are used to secure the first substantially hollow cylindrical member 12 to the protruding wellhead pipe 20, and the pipe clamp 26 that extends circumferentially around the first substantially hollow cylindrical member 12, and that may be adjusted using the tightening mechanism 28. In one embodiment of the present invention, the inner wall 38 of the first substantially hollow cylindrical member 12 further includes at least one, and preferably two, substantially annular recesses 48. Positioned partially within the substantially annular recesses 48 are gasket rings 50 that protrude into the receiving cavity 42. The gasket rings 50 are used to form a seal to prevent gases from escaping between the inner wall 38 and the protruding wellhead pipe 20.

The wellhead assembly 10 described above is preferably made of a thermoplastic material, such as polyethylene, which is more resistant to the corrosive environment of the landfill, less expensive than other materials, and flexible when subject to compression by the tightening mechanism 28 so that a seal is formed between the wellhead assembly 10 and the protruding wellhead pipe 20. Other material, however, may be used as well.

The wellhead assembly described above can quickly and simply be secured to a protruding wellhead pipe to provide a conduit for landfill gases escaping from the protruding wellhead pipe to a treatment facility. The inventive wellhead assembly is readily secured to the protruding wellhead pipe by slidably receiving the protruding wellhead pipe within the receiving cavity rather than requiring a bolted or welded flange or the like that extends from the protruding wellhead pipe. The wellhead assembly is capable of being quickly removed rather than being glued or otherwise permanently affixed to the protruding wellhead pipe. In this manner, the connection and disconnection times are greatly reduced, thereby minimizing exposure of workers and the surrounding environment to the hazardous landfill gases.

Other modifications of the invention described above will be obvious to those skilled in the art, and it is intended that the scope of the invention be limited only as set forth in the appended claims.

What is claimed is:

1. A wellhead assembly for engaging a protruding wellhead pipe, said protruding wellhead pipe having a diameter, comprising:

a first substantially hollow cylindrical member having a first open end, a second closed end, an outer wall, an inner wall, a receiving cavity therein, said closed end having a first aperture therethrough, said first aperture having a diameter smaller than said diameter of said protruding wellhead pipe, said first substantially hollow cylindrical member being capable of slidably and removably receiving said protruding wellhead pipe within said receiving cavity;

a second substantially hollow cylindrical member having a first open end, a second closed end, and an interior cavity, said first open end being coupled to said closed end of said first substantially hollow cylindrical member and being positioned so as to surround and enclose said first aperture, said second substantially hollow cylindrical member further including a second aperture therethrough, wherein when said first substantially hollow cylindrical member slidably receives said protruding wellhead pipe, a fluid passageway is formed from said wellhead pipe, through said receiving cavity and said aperture of said first substantially hollow cylindrical member, and through said interior cavity and said second aperture of said second substantially hollow cylindrical member;

wherein said inner wall of said first substantially hollow cylindrical member includes a pair of substantially annular recesses formed therein; and a pair of annular gasket rings extending circumferentially around and communicating with an inner wall of said first substantially hollow cylindrical member, said pair of annual gasket rings each positioned partially within and protruding from said pair of substantially annual recesses, said pair of annular gasket rings extending circumferentially around and communicating with said protruding wellhead pipe and forming a fluid seal between said protruding wellhead pipe and said first substantially hollow cylindrical member, when said protruding wellhead pipe is slidably received within said receiving cavity.

2. The wellhead assembly according to claim 1, wherein the first substantially hollow cylindrical member and the second substantially hollow cylindrical member are made of a thermoplastic material.

3. The wellhead assembly according to claim 1, wherein the second closed end of the second substantially hollow cylindrical member further comprises a removable cap.

4. The wellhead assembly according to claim 1, wherein said second substantially hollow cylindrical member is capable of being coupled to piping that substantially surrounds and encloses said second aperture.

5. The wellhead assembly according to claim 4, wherein a valve is coupled to said piping.

6. The wellhead assembly according to claim 1, further comprising:

a clamping ring member extending circumferentially around said first substantially hollow cylindrical member, said clamping member including a means for adjusting the size of the ring from a loose, released condition to a tightened, engaged, condition thereby to compress said inner wall of said first substantially hollow cylindrical member against said protruding wellhead pipe.

7. The wellhead assembly of claim 1, wherein said first and second cylindrical members are comprised of polyethylene.

8. A waste removal assembly comprising:

a protruding wellhead pipe;
   a wellhead assembly including,
      a first substantially hollow cylindrical member having a first open end, a second closed end, an outer wall, an inner wall, and a receiving cavity therein, said closed end having a first aperture therethrough, said protruding wellhead pipe being slidably and removably positioned within said receiving cavity in said first substantially hollow cylindrical member,
      a second substantially hollow cylindrical member having a first open end, a second closed end, and an interior cavity, said first open end being coupled to said closed end of said first substantially hollow cylindrical member and being positioned so as to substantially surround and enclose said first aperture, said second substantially hollow cylindrical member further including a second aperture therethrough, wherein when said first substantially hollow cylindrical member slidably receives said protruding wellhead pipe, a fluid passageway is formed from said wellhead pipe, through said receiving cavity and said first aperture of said first substantially hollow cylindrical member, and through said interior cavity and said second aperture of said second substantially hollow cylindrical member;
      wherein said inner wall of said first substantially hollow cylindrical member includes a pair of annular recesses formed therein; and
      a pair of annular gasket rings, each of said annular gasket rings positioned partially within and protruding from one of said annular recesses, each of said annular gasket rings extending circumferentially around said protruding wellhead pipe and communicating with said protruding wellhead pipe and inner wall of said first substantially hollow cylindrical member so as to form a fluid seal therebetween.

9. The wellhead assembly of claim 8, wherein said first and second cylindrical members are comprised of polyethylene.

* * * * *